United States Patent
Wong et al.

(10) Patent No.: US 9,704,473 B2
(45) Date of Patent: Jul. 11, 2017

(54) VARIABLE ACOUSTIC GRATING BASED ON CHANGING ACOUSTIC IMPEDANCES

(75) Inventors: Serena Han Ying Wong, Menlo Park, CA (US); Jeng Ping Lu, Fremont, CA (US); Raj B. Apte, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 923 days.

(21) Appl. No.: 12/965,796

(22) Filed: Dec. 10, 2010

(65) Prior Publication Data

US 2012/0146745 A1  Jun. 14, 2012

(51) Int. Cl.
*G02B 6/34* (2006.01)
*G10K 11/30* (2006.01)

(52) U.S. Cl.
CPC .............. *G10K 11/30* (2013.01); *G02B 6/34* (2013.01)

(58) Field of Classification Search
CPC ........................................ G02B 6/34
USPC ............................................. 385/37
See application file for complete search history.

(56) References Cited

U.S. PATENT DOCUMENTS

| | | | |
|---|---|---|---|
| 3,795,434 A * | 3/1974 | Ash ................... | 385/129 |
| 4,609,890 A * | 9/1986 | Oates ................. | H03H 9/12 310/335 |
| 5,448,665 A * | 9/1995 | Kershaw et al. .......... | 385/30 |
| 6,226,427 B1 * | 5/2001 | Nuang .................. | 385/40 |
| 6,801,686 B2 * | 10/2004 | Sorin .................. | 385/28 |
| 7,456,825 B2 * | 11/2008 | Kent .................... | G06F 3/0436 178/18.01 |
| 7,809,219 B2 * | 10/2010 | Kilic ................. | G01H 9/00 356/480 |
| 2004/0067000 A1 * | 4/2004 | Bates et al. ............ | 385/7 |
| 2010/0092125 A1 * | 4/2010 | Kilic .................. | G01H 9/004 385/11 |

OTHER PUBLICATIONS

Wygant, Ira O., et al., "An Integrated Circuit with Transmit Beamforming and Parallel Receive Channels for 3D Ultrasound Imaging: Testing and Characterization", IEEE Ultrasonics Symposium, pp. 25-28, 2007.
Talman, James R., et al., "Unit-Delay Focusing Architecture and Integrated-Circuit Implementation for High-Frequency Ultrasound", IEEE Trans. on Ultrasonics, Ferroelectrics, and Frequency Control, vol. 50, No. 11, pp. 1455-1463, Nov. 2003.
Thomenious, Kai E., "Evolution of Ultrasound Beamformers", IEEE Ultrasonics Symposium, pp. 1615-1622, 1996.
Steinberg, Bernard D., "Digital Beamforming in Ultrasound", IEEE Trans. on Ultrasonics, Ferroelectrics, and Frequency Control, vol. 39, No. 6, pp. 716-721, Nov. 1992.

(Continued)

*Primary Examiner* — Thomas A Hollweg
*Assistant Examiner* — Mary A El Shammaa
(74) *Attorney, Agent, or Firm* — Blakely Sokoloff Taylor & Zafman LLP

(57) ABSTRACT

An embodiment is a variable acoustic grating. Each of the local grating structures in an array of local grating structures has a variable impedance such that the impedance is modified, steering an ultrasonic signal impinging on the array in a reflection or transmission mode through a medium.

11 Claims, 13 Drawing Sheets

(56) References Cited

OTHER PUBLICATIONS

Ladabaum, Igal, et al., "Surface Micromachined Capacitive Ultrasonic Transducers", IEEE Trans. on Ultrasonics, Ferroelectrics, and Frequency Control, vol. 45, No. 3, pp. 678-690, May 1998.
Lohfink, Annette, et al., "Linear and Nonlinear Equivalent Circuit Modeling of CMUTs", IEEE Trans. on Ultrasonics, Ferroelectrics, and Frequency Control, vol. 52, No. 12, pp. 2163-2172, Dec. 2005.
Culjat, Martin O., et al., "Evaluation of Gallium-Indium Alloy as an Acoustic Couplant for High-Impedence, High-Frequency Applications", Acoustics Research Letters Online, Acoustic Society of America, pp. 125-130, Jun. 2005.

\* cited by examiner

VARIABLE ACOUSTIC GRATING BASED ON CHANGING ACOUSTIC IMPEDANCES

TECHNICAL FIELD

The presently disclosed embodiments are directed to the field of semiconductor devices, and more specifically, to acoustic grating.

BACKGROUND

Dynamic steering and focusing of ultrasound arrays is essential in imaging and therapeutics to maintain resolution and pressure gain across an imaged or treated volume. As the array aperture increases in size to achieve the high lateral resolution needed for focusing at a distance, so does the number of elements required to form a tight beam with low side lobes.

Various fixed acoustic gratings have been fabricated by etching or shaping an acoustic material. These fixed gratings use a single frequency transmitter impinging on the grating structure to produce a particular steering angle or focusing of sound. U.S. Pat. No. 7,385,711 describes a blazed grating made out of solid material that is used to characterize liquid properties by measuring the attenuation and angle of the ultrasound beam that reflects or transmits through the grating. A number of physical zone plates and Fresnel phase plates have also been designed for ink drop ejection (U.S. Pat. No. 5,041,849) and ultrasonic therapeutics (U.S. Pat. No. 5,817,036). While the approach of using a machined material does reduce the complexity of the electronics, it does not allow for variability of the ultrasound beam.

U.S. Pat. Nos. 4,011,747 and 4,329,876 describe a set of fixed grating with a chirped surface acoustic wave or chirped bulk acoustic wave to produce a focused bulk acoustic wave that scans in the linear direction at the speed of sound of the surface wave or bulk wave, respectively. While this grating produces a scanned focus, the rate of scan is not variable, since it is dependent on material properties. Also, the focus can only scan effectively in one direction across the linear grating. This lack of flexibility prohibits the dynamic electronic control needed to scan a whole volume image.

Other approaches to manufacturing gratings, zone plates, and phase plates have involved modification of the transducer. U.S. Pat. No. 4,129,799 describes an approach to pole neighboring Fresnel zones of the transducer to be 180 degrees out of phase. Then actuation of the whole plate by a singular voltage source will produce a focused point of sound. While the electronics is simplified by only having one transmitting/driving signal, once the transducer is poles in a particular configuration, it cannot be modified dynamically to perform a different focusing or steering feature.

U.S. Pat. Nos. 3,911,730; 4,307,613; and 5,540,230 describe another way of producing a grating by modifying the transducer is to separate the electrodes or dicing elements in different regions of the transducer area. Applying signals with different amplitudes and phases to neighboring elements can be used to steer and focus the sound. For these gratings, the elements are defined such that only a small number of discreet signals (2 or 4 phases, for example) are needed to focus or steer the beam. The simplicity of the electronics and the defined regions on the transducer, however, means that these arrays are unable to dynamically focus and steer to the same extent as a fully controlled 2D array. Furthermore, these techniques still require circuits that provide phase shifts or multiple transmit signals. U.S. Pat. No. 4,307,613 describes a reconfigurable Fresnel zone plate with an electrode configuration that allows a focal point to be scanned linearly. However, because of the way the electrodes are defined, this phase plate is only scannable in one direction and not as fully flexible as a fully controlled 2D array. While electroding configurations may allow some flexibility in the focusing and steering of the array, ultimately they do not allow the full flexibility of steering of a full 2D array and also still require separate transmit signals in order to create a focus or steered beam.

SUMMARY

One disclosed feature of the embodiments is a variable acoustic grating. Each of the local grating structures in an array of local grating structures has a variable impedance such that the impedance is modified, steering an ultrasonic signal impinging on the array in a reflection or transmission mode through a medium.

BRIEF DESCRIPTION OF THE DRAWINGS

Embodiments may best be understood by referring to the following description and accompanying drawings that are used to illustrate various embodiments. In the drawings.

DETAILED DESCRIPTION

Figure 1:
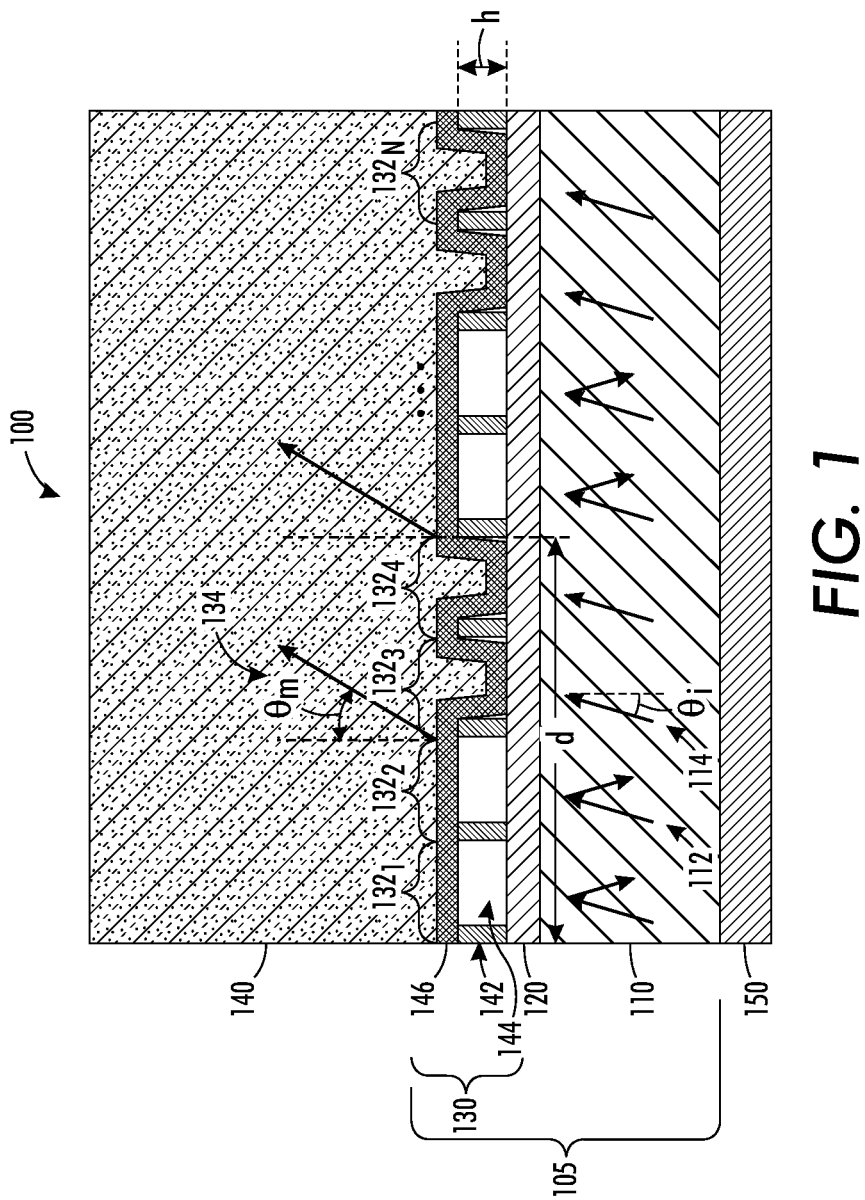
FIG. 1 is a diagram illustrating a system using transmission mode according to one embodiment.

One disclosed feature of the embodiments is a variable acoustic grating. An array of local grating structures may be used to provide variable acoustic impedance. Each of the local grating structures may have a variable impedance such that the impedance is modified, steering an ultrasonic signal impinging on the array in a reflection or transmission mode through a medium. One disclosed feature of the embodiments may include a control layer on a substrate. The control layer may have a controller that generates actuation of an array of local grating structures. Each of the local grating structures may include a membrane defining a gap or a cavity. The local grating structure may be made to have variable acoustic impedance that may be modified by modifying the deflection of the membrane. In particular, the impedance may be modified by collapsing or not collapsing the membrane. The array of the local grating structures may steer transmitted signals that are coupled or impinging on the array in a reflection or transmission mode. The array modifies portions of the ultrasound signal so that the interference of the resulting signals focuses and steers the beam, much like in optical grating structures. Other techniques to modify the acoustic impedance may exist. For example, the membranes may be inflatable instead of collapsible. In general, the membranes may be in a first state and actuated to be in a second state such that the acoustic impedance may be modified. The position of the membranes may also be incrementally modified and is not limited to two discrete states for fine resolution of acoustic impedance change. The membranes, or similar structures, may have multiple positions for variable acoustic impedance.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

One disclosed feature of the embodiments is a method and apparatus for variable acoustic grating. The technique uses a dynamic, actuation control to modify the properties in an acoustic grating. The varying properties and periodicity of different structures in the grating steers or focuses the ultrasound. This simplicity allows scalability of this structure to the larger apertures needed for imaging. The array may controlled by a simple and low-cost polysilicon array. In addition, the technique may allow using only one transmit signal. If the grating is implemented as a two-dimensional (2-D) array, the structure may allow a single element, single transmit signal transducer to be steered and focused with the same flexibility as a full 2-D array. From the linear amplitude and phase gratings, the technique may easily be scalable and modified to vary in a second axis for full 2-D focusing and steering in different mediums.

The variable acoustic grating may be constructed of an array of individual local grating structures that change the effective acoustic impedance in a local area, thus changing the reflected and transmitted acoustic signal. Varying the pattern of impedances across an area may produce an acoustic grating that steers a single frequency, sound wave. The position or state of each individual local structure in this array may be dynamically controlled with an actuation such as a direct current (DC) signal. This simplifies the electronics from the complicated analog phase and timing circuits needed for steering and focusing. Therefore, a simpler, low-cost, polysilicon backplane may be used to control the grating, which increases the cost-effectiveness and simplicity of the system.

Disclosed features of the embodiments may operate in two different modes: a transmission mode and a reflection mode. In the transmission mode, the transmitter is located opposite of the medium with respect to the grating structure. In the reflection mode, the transmitter is located in the medium.

FIG. 1 is a diagram illustrating a system 100 using transmission mode according to one embodiment. The system 100 includes a grating structure 105, a medium 140, and a transmitter 150. The system 100 may include more or less than the above components. For example, the transmitter 150 may be integrated with the grating structure 105.

The medium 140 may be any suitable medium for ultrasonic signal transmission. In one embodiment, the medium is water. The transmitter 150 generates an ultrasonic signal. For the transmission mode, the transmitter 150 is coupled to the grating structure 105 on the side opposite to the medium 140. The ultrasonic signal generated from the transmitter 150 may be reflected at the surface of a layer internal to the grating structure 105, or transmitted through the medium 140 via the grating structure 105 according to the dynamic control of the grating structure 105.

The grating structure 105 is coupled to the medium 140 on one side and to the transmitter 150 on the opposite side to dynamically steer or focus the ultrasonic signal generated by the transmitter 150. The grating structure 105 may include a substrate 110, a control layer 120, and an array 130 of local grating structures.

The substrate 110 may be any substrate suitable for ultrasound signal processing. In one embodiment, the substrate 110 may be made of one of glass, quartz, stainless steel, or plastic. The control layer 120 is deposited on the substrate 110. It may include a controller that generates an actuation to effectuate the dynamic steering or focusing of the ultrasonic signal. It may include electronic circuitry, electrostatic actuator, micro-machined actuator, magnetic or electromagnetic actuator that provides the actuation to control the array 140 of grating structures. For electrostatic actuation, it may include an array of TFT layers, electrode, and/or other suitable electronic components. The TFT layers may be amorphous or polysilicon. The use of TFT layers may lead to low cost and easy scalability to large areas that may be needed for high resolution imaging at a distance.

The array 130 of local grating structures is coupled to the control layer 120. The array 130 may include a plurality of local grating structures $132_k$, k=1, 2, . . . , N, where N is a positive integer. The plurality of local grating structures $132_k$ (k=1, 2, . . . , N) may individually receive the actuation from the controller in the control layer 120. Each of the local grating structures $132_k$ (k=1, 2, . . . , N) may have a variable impedance as seen by the ultrasonic signal. For the transmission mode, the transmit ultrasonic signal comes from the transmitter 150 at the side of the substrate 110. For example, the signals 112 and 114 are the ultrasonic signals from the side of the substrate and impinging on the array 130.

The local grating structure $132_k$ may include a membrane 146 that defines or forms a gap or a cavity 144. The gap or the cavity 144 may be defined by spacers or stand-off on the membrane 146. The stand-off may have any suitable structure such as cylinder or cone structure that defines the gap between the membrane 146 and the substrate 110. The membrane 146 may be supported by vertical walls 142. The vertical walls 142 may be separated from or integrated as part of the membrane 146 and may be formed by spacers or stand-offs on the membrane 146. The gap or the cavity 144 may be filled with air or any suitable liquid. The gap or the cavity 144 may be modified to have different shapes and sizes depending on the frequency and spacing needed for operation. The vertical walls 142 may surround the gap or the cavity 144. They may be spacers made of silicon nitride.

The height h of the walls 142 and the gap or the cavity 144 may be selected to provide desired acoustic effects. The membrane 146 may be made of metal, plastic, or silicon nitride. The membrane 146 may seal the gap or the cavity 144 on the top. It may be a single-layer membrane, a multilayer membrane, a patterned membrane, or a bistable membrane. The membrane 146 may be made to be bistable by imparting stress into it. This is advantageous because then actuation may be only needed to change the state of the membrane and does not need to be held to maintain the particular shape.

The membrane 146 may deflect from an uncollapsed state into the gap or the cavity 144 when the actuation is applied to the membrane 146 such that the impedance of the corresponding local grating structure is modified. In another embodiment, the membrane 146 may be inflated from an uninflated state to an inflated state. Other techniques to modify the structure of the local structures to result in variable acoustic impedance may be available. The change in the effective impedance cause variable amplitude or phase of the ultrasonic signal that impinges the array in a reflection or transmission mode through the medium 140. The membrane 146 may deflect into the gap or the cavity 144 in a collapsed state when the actuation exceeds a pull-in threshold. When the actuation is electrostatic, the actuation is a control DC voltage and the pull-in threshold is a pull-in voltage. The pull-in threshold is a threshold above which the actuation pulls the membrane 146 substantially into the gap or cavity 144 toward the local layer 120 or the substrate 110. In another embodiment, the membrane 146 may inflate from an uninflated state into the gap or cavity 144 in an inflated state according to the actuation.

Depending on the state of the individual local grating structures $132_k$, the transmit ultrasonic signals may be reflected in the substrate 110 or transmitted through the medium 140. For example, the signal 112 impinges on the structure $132_2$ which is in the uncollapsed state and is therefore reflected. The signal 114 impinges on the structure $132_3$ at an incident angle $\theta_i$. The structure $132_3$ is in the collapsed stated and therefore the signal 114 is transmitted through the medium 134 with a steering angle $\theta_m$.

By applying the actuation force individually at the array 130, the local grating structures $132_k$'s may have their uncollapsed or collapsed states or uninflated or inflated states forming into a pattern. The pattern may have a periodicity d.

Figure 2:
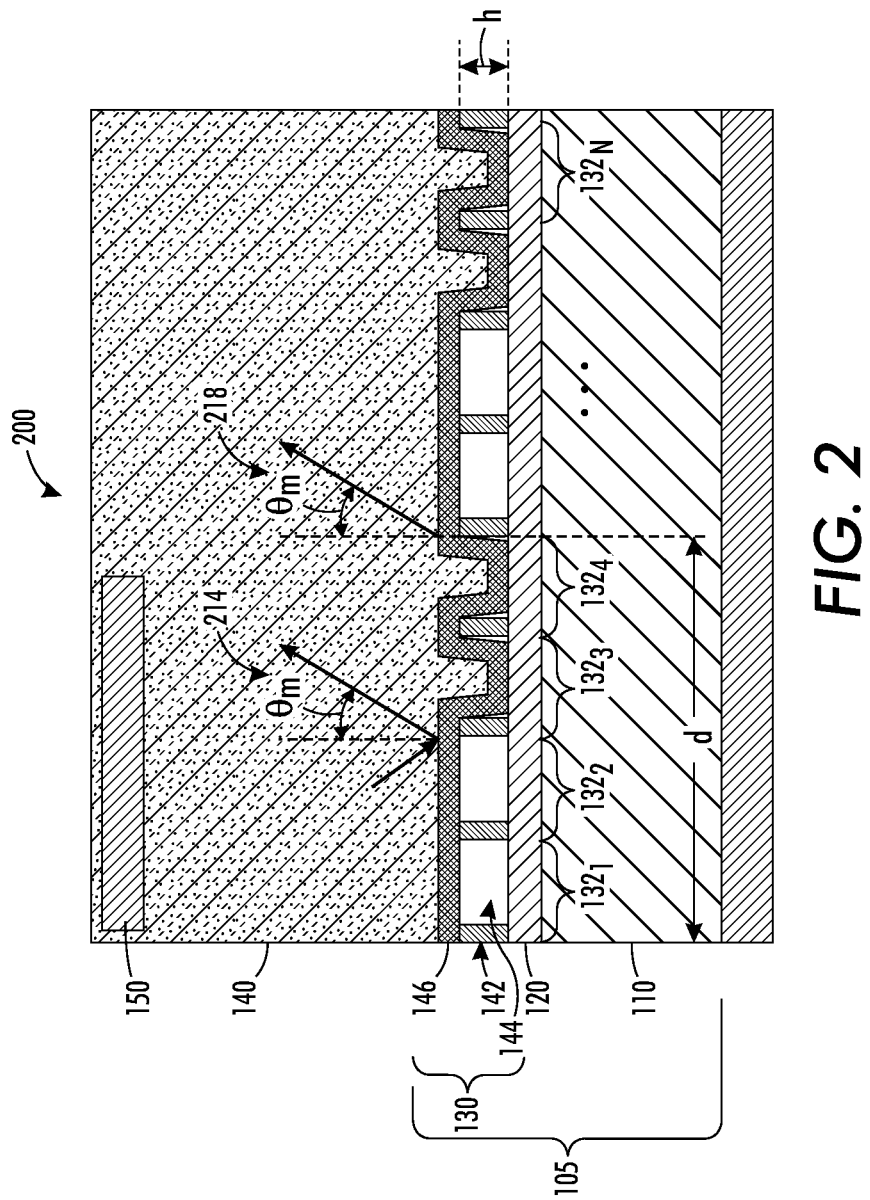
FIG. 2 is a diagram illustrating a system using reflection mode according to one embodiment.

FIG. 2 is a diagram illustrating a system 200 using reflection mode according to one embodiment. The system 200 is similar to the system 100 except that the transmitter 150 is located in the medium 140.

The transmit signal generated by the transmitter 150 may be reflected with different phases shifts, depending on the state of the corresponding local grating structures, at the surface of the grating structure. For example, the transmit signals 212 and 216 are reflected to produce the reflected signals 214 and 218, respectively. The angle of incident is $\theta_i$ and the reflected angle is $\theta_m$. Similarly as in the case of the transmission mode in FIG. 1, the individual local grating structures $132_k$ may be actuated to be in uncollapsed state or collapsed state (or uninflated state or inflated state) and cause a change in the effective impedance, which in turn cause the amplitude or phase of the transmit signals to be varied. By proper selecting the height h of the cavities in the array 130 and other properties, the phase shift of the reflected signals may be tuned at some specified values. For example, the phase shift at the uncollapsed membrane may be a first phase shift at approximately 180 degrees and the phase shift at the collapsed membrane may be a second phase shift at approximately zero degree. As will be discussed later, by proper control of the actuation, any phase shifts may be accomplished according to the desired steering and/or focusing. The array 130 may modify portions of the ultrasound signal so that the interference of the resulting signals focuses and/or steers the beam of the ultrasonic signals, much like in optical grating structures.

Figure 3:
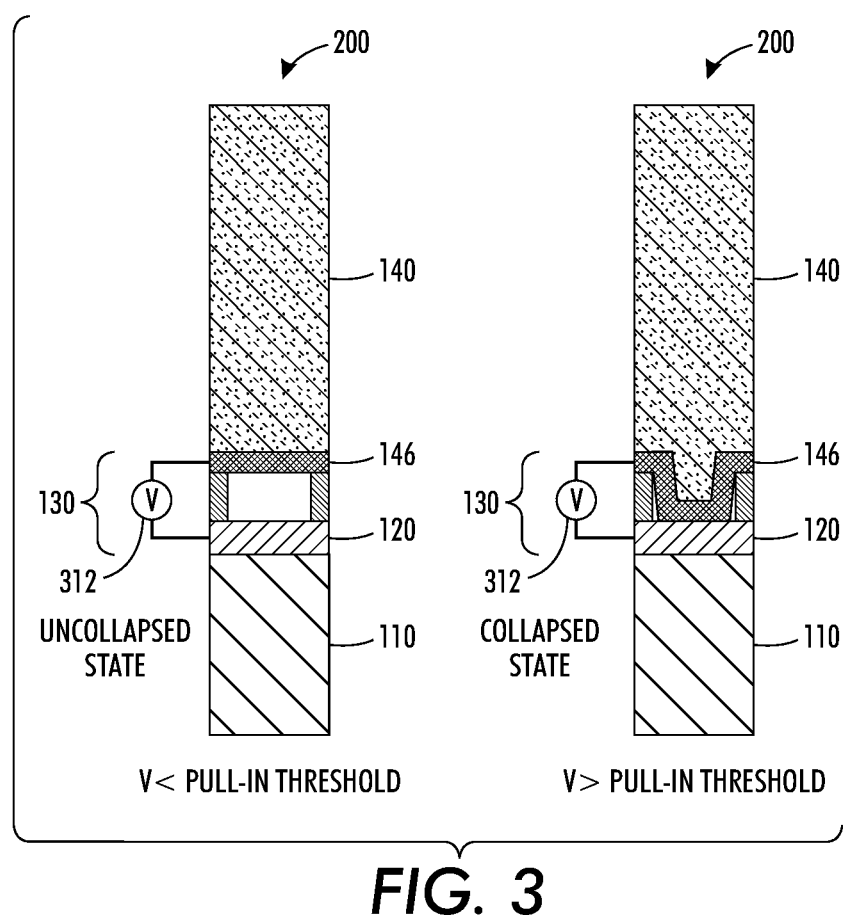
FIG. 3 is a diagram illustrating actuation control of membrane according to one embodiment.

FIG. 3 is a diagram illustrating actuation control of membrane according to one embodiment.

The control layer 120 applies an actuation V to the membrane 146. The actuation V may be electrostatic, thermal, magnetic, or electromagnetic. In one embodiment, it is a DC voltage. The local structure $132_k$ may have a pull-in threshold. When the actuation V is less than this pull-in threshold, the membrane 146 is in uncollapsed state. The effective impedance as seen by the transmit signal from the substrate 110 (in the transmission mode) is $Z_1$. When the actuation V is more than this pull-in threshold, the membrane 146 is in collapsed state, or it is pulled into the gap or cavity 144 toward the control layer 120 or the substrate 110. The effective impedance as seen by the transmit signal from the substrate 110 (in the transmission mode) is $Z_2$.

The height of the gap or cavity 144 and other properties, such as the thickness of the membrane 146 and the control layer 120 (e.g., the thickness of the bottom electrode and the TFT layer) and the material of the substrate 110, may be selected so that the resulting effective impedances $Z_1$ and $Z_2$ may be tuned at some specified values. For example, the thickness of the control layer 120 and the membrane 146 may be thin compared with the wavelength of the ultrasonic signal in the medium so that the effective impedance $Z_2$ may be similar or within the same order of magnitude as the impedance of the substrate 110 ($Z_{substrate}$). In addition, the impedance of the substrate 110 may be further matched to the medium using a quarter wavelength of plastic (e.g., polydimethylsiloxane or PDMS). Since these layers are well matched to the medium 140, the transmission in areas where the membrane 146 is in the collapsed state is large and may be made to be nearly 100%, allowing the ultrasonic signal to be transmitted through the medium 140. When in the uncollapsed state, the effective impedance $Z_1$ may be very low, resulting in a transmission of essentially 0%. This is due to the large acoustic impedance difference (e.g., nearly $10^4$ difference) between the gap or cavity 114 and the medium 140 (e.g., air and solids/liquids).

Figure 4:
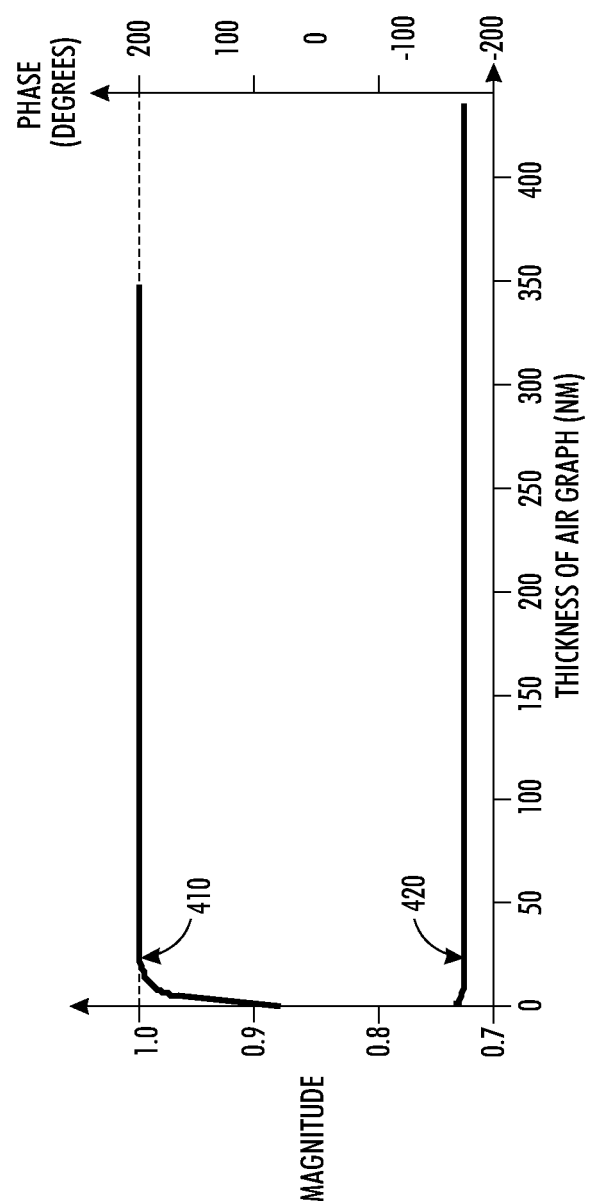
FIG. 4 is a diagram illustrating reflection coefficient in transmission mode according to one embodiment.

FIG. 4 is a diagram illustrating reflection coefficient in transmission mode according to one embodiment. The curves 410 and 420 correspond to the magnitude and phase (in degrees) of the reflection coefficient at the local grating structures $132_k$'s. The values are obtained for a 7 MHz medical imaging transducer with a glass substrate (having 12.1 MRayl) imging into water (1.5 MRayl). The curves 410 and 420 show that the reflection coefficient for air-filled cavities is 100% for an air gap thickness h above 30-50 nm. This large reflectance for the uncollapsed membrane means that no ultrasound may be transmitted in these regions of the grating. For the collapsed membrane, in contrast, the transmission is greater than 25%, depending on whether a quarter wave matching layer is used to the glass impedance to water.

Figure 5:
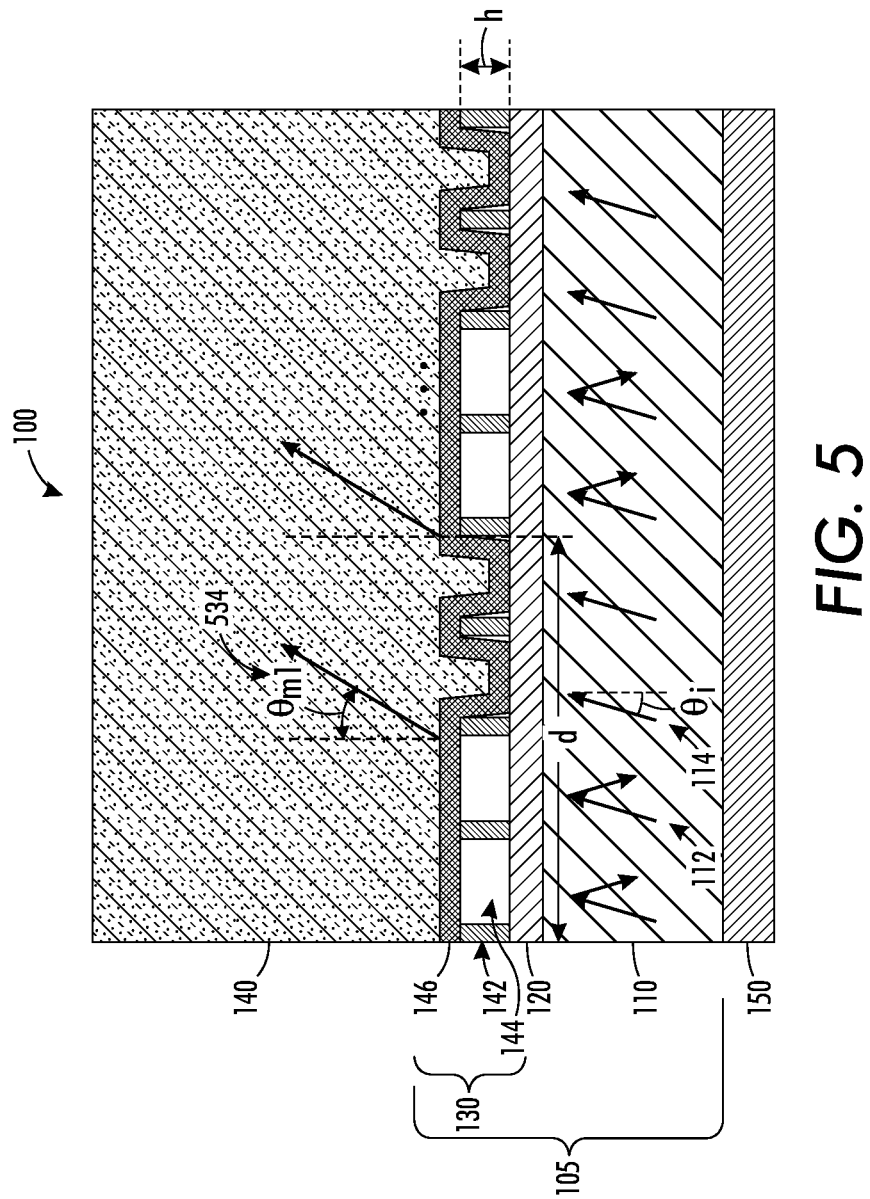
FIG. 5 is a diagram illustrating transmission angle at a first periodicity according to one embodiment.

FIG. 5 is a diagram illustrating transmission angle at a first periodicity according to one embodiment.

Using different transmissive properties of the grating, a linear transmission grating may be produced. The steering angle $\theta_m$ of a transmission grating may be given by the following equation:

$$m\lambda = d(\sin(\theta_m) - \sin(\theta_i)) \quad (1)$$

where $\theta_i$ is the angle of incidence of the transmit ultrasonic signal, d is the width of the grating period (e.g., the periodicity), $\lambda$ is the wavelength of the ultrasonic signal, and m is the mode number.

In one embodiment, m may be selected as 1 although other modes may be used for steering. As seen from equation (1), the grating is variable because the individual membranes in the local grating structures $132_k$'s may be individually collapsed according to a desired pattern. The periodicity d may therefore be controlled dynamically. The grating may be changed dynamically with only the control of a single actuation (e.g., a single bias voltage per local structure) that can be predetermined and held on the control layer 120 (e.g., a polysilicon TFT array). Thus, steering may be accomplished using an array of preset actuations (e.g., DC signals) combined with a single element transmitter.

As discussed above, in this mode, the ultrasonic signals are generated through the substrate 110. For example, the signal 114 has an angle of incidence of $\theta_i$. The periodicity is $d_1$ (in this illustrative example, $d_1$ corresponds to 4 local grating structures), and the steering angle is $\theta_{m1}$ as the signal 534 is transmitted through the medium 140.

Figure 6:
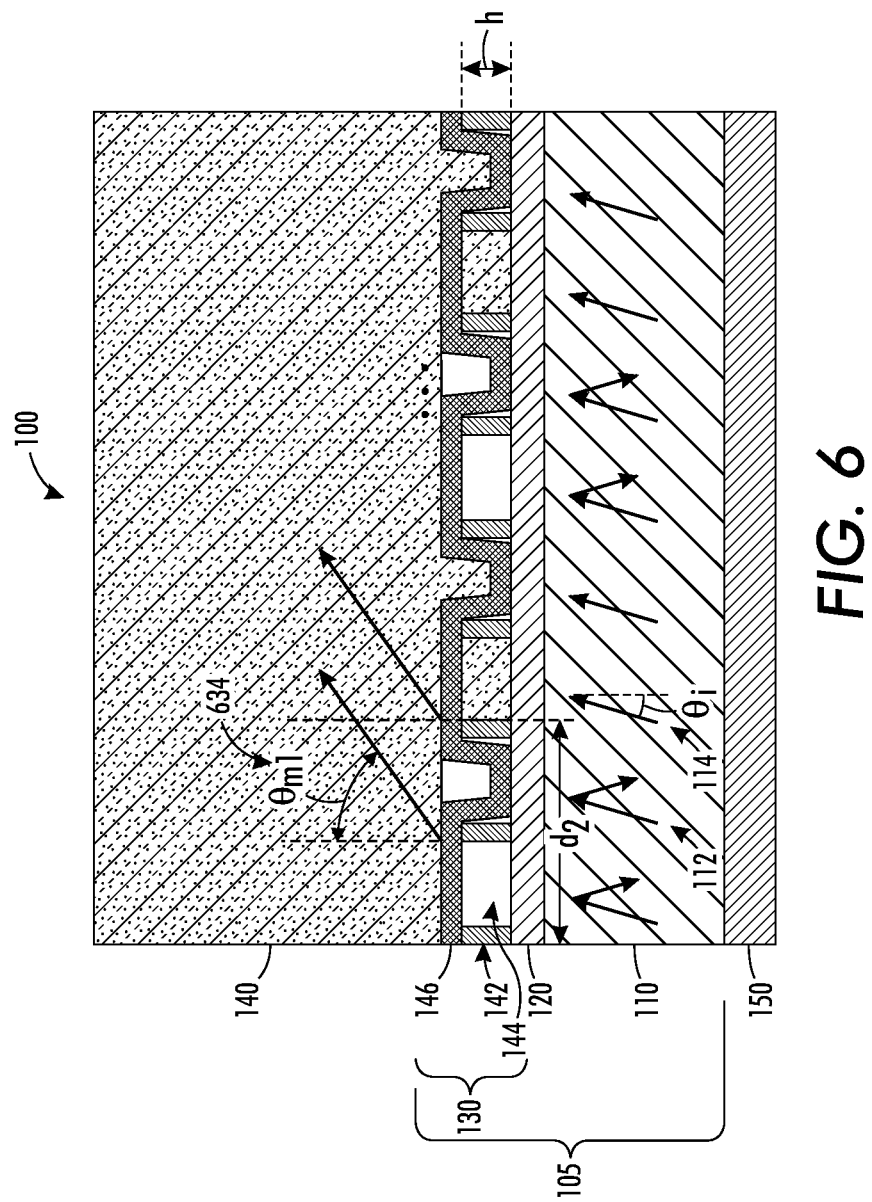
FIG. 6 is a diagram illustrating transmission angle at a second periodicity according to one embodiment.

FIG. 6 is a diagram illustrating transmission angle at a second periodicity according to one embodiment. The ultrasonic signals are generated through the substrate 110. For example, the signal 114 has an angle of incidence of $\theta_i$. The periodicity is $d_2$ (in this illustrative example, $d_2$ corresponds to 2 local grating structures), and the steering angle is $\theta_{m2}$ as the signal 634 is transmitted through the medium 140.

Figure 7:
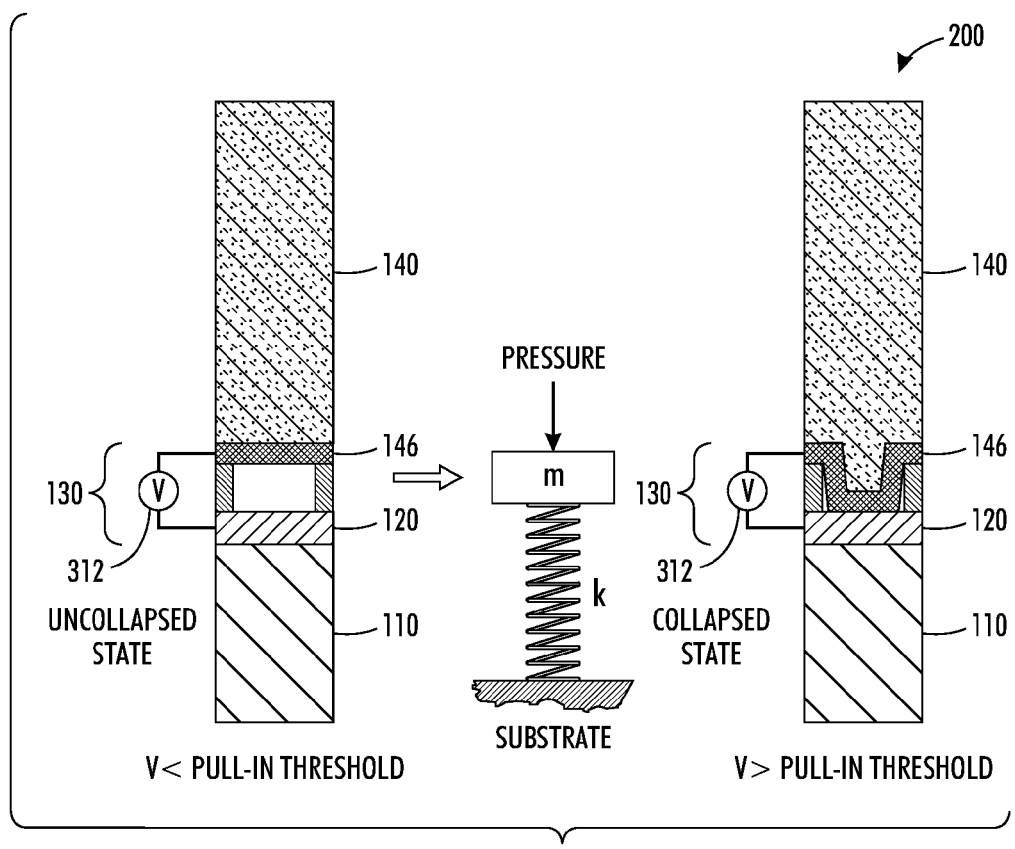
FIG. 7 is a diagram illustrating effective impedance seen from front side of cavities according to one embodiment.

FIG. 7 is a diagram illustrating effective impedance seen from front side of cavities according to one embodiment. This corresponds to the reflection mode as shown in FIG. 2.

Different impedance properties (e.g., phase shifting properties) of the membrane may be realized by aiming the ultrasound at the front side of the cavities, from the medium side, as shown in FIG. 2. The impedance of the individual local grating structures $132_k$'s in the array 130 may be calculated by approximating the structure as an equivalent mass, m, and spring constant, k, that changes with the actuation (e.g., the bias voltage). The impedance of such a structure may be given by the following equation:

$$Z_3 = j\omega m + k/j\omega \quad (2)$$

where $\omega$ is the angular frequency of operation.

Because the mass m and spring constant k of the membrane are so smaller than the impedance of the medium 140 (e.g., water) by 1-2 orders of magnitude, the reflection coefficient may have a 180-degree phase shift when the membrane is not collapsed. In contrast, a collapsed membrane may have a phase shift that is essentially zero degrees. Since the thickness of the membrane tends to be negligible (e.g., several microns) at the frequencies of interest, the effective impedance $Z_4$ of the collapsed membrane is equivalent to the impedance of the substrate 110, which is usually glass (12.1 MRayl), and larger than that of water. Therefore, the phase shift of the reflection coefficient may be zero.

As shown in FIG. 2, a reflection grating may be constructed similarly to the transmission grating shown in FIG. 1 where the resultant steering angle $\theta_m$ is given by the following equation:

$$2\pi m = 2\pi d(\sin(\theta_m)\sin(\theta_i))/1 + \phi \quad (3)$$

where $\phi$ is the phase step of the grating, $\theta_i$ is the angle of incidence, m is the order, and d is the grating periodicity.

In one embodiment, the phase $\phi$ is 180 degrees. This is advantageous compared to other angle values for $\phi$ because in this case, the amplitude of the odd orders (m-0, 2, . . . ) of the ultrasonic signal is zero. Thus, all the energy may be concentrated in the desired m=1 mode. By varying the membranes that are collapsed and uncollapsed, as in the transmission grating, the resultant angle of the ultrasonic signal be varied and the ultrasonic beam may be steered dynamically. For example, as shown in FIG. 2, the signal 214 has a 180-degree phase shift because the transmit signal 212 impinges on the uncollapsed membrane. The signal 218 has a zero-phase shift because the transmit signal 216 impinges on the uncollapsed membrane.

Phase shifts other than 180 degrees and zero degree may be obtained by varying the actuation force (e.g., DC control voltage) at the membrane.

Figure 8:
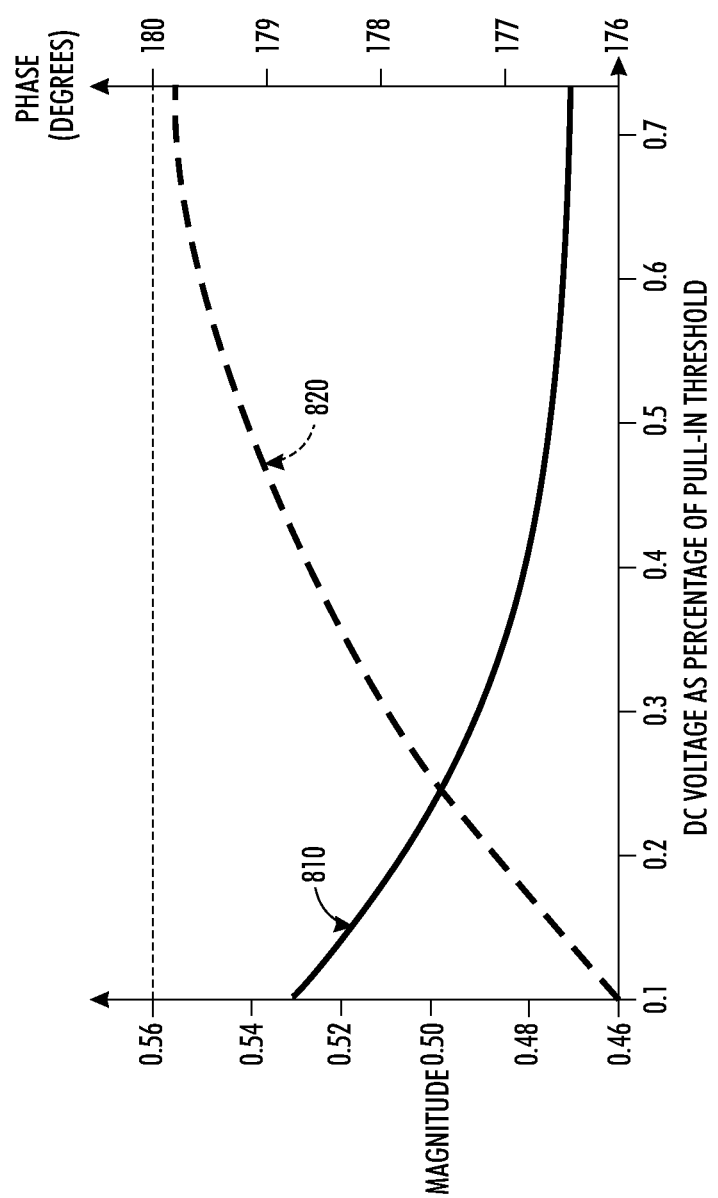
FIG. 8 is a diagram illustrating angle shift of reflection coefficient as function of actuation control according to one embodiment.

FIG. 8 is a diagram illustrating angle shift of reflection coefficient as function of actuation control according to one embodiment. FIG. 8 shows curves 810 and 820 for a system operating in the reflection mode as shown in FIG. 2. The curves 810 and 820 show the magnitude and phase of the reflection coefficient as function of the actuation. In this illustrative example, the actuation is expressed as the percentage of the DC control voltage and the pull-in voltage.

By varying the actuation force (e.g., the DC control voltage), changes in phase may be obtained due to the change in the effective spring constant of the membrane. In this illustrative example, the membrane is a silicon nitride membrane and the center frequency is 15 MHz. The curve 820 shows that a 4-degree phase shift may be obtained over 0-100% of the pull-in voltage. It is anticipated that other amounts of phase shift may be achieved with proper selection of the geometries (e.g., height, size, shape) and/or materials of the membranes, the layers, and the operating frequency.

Figure 9:
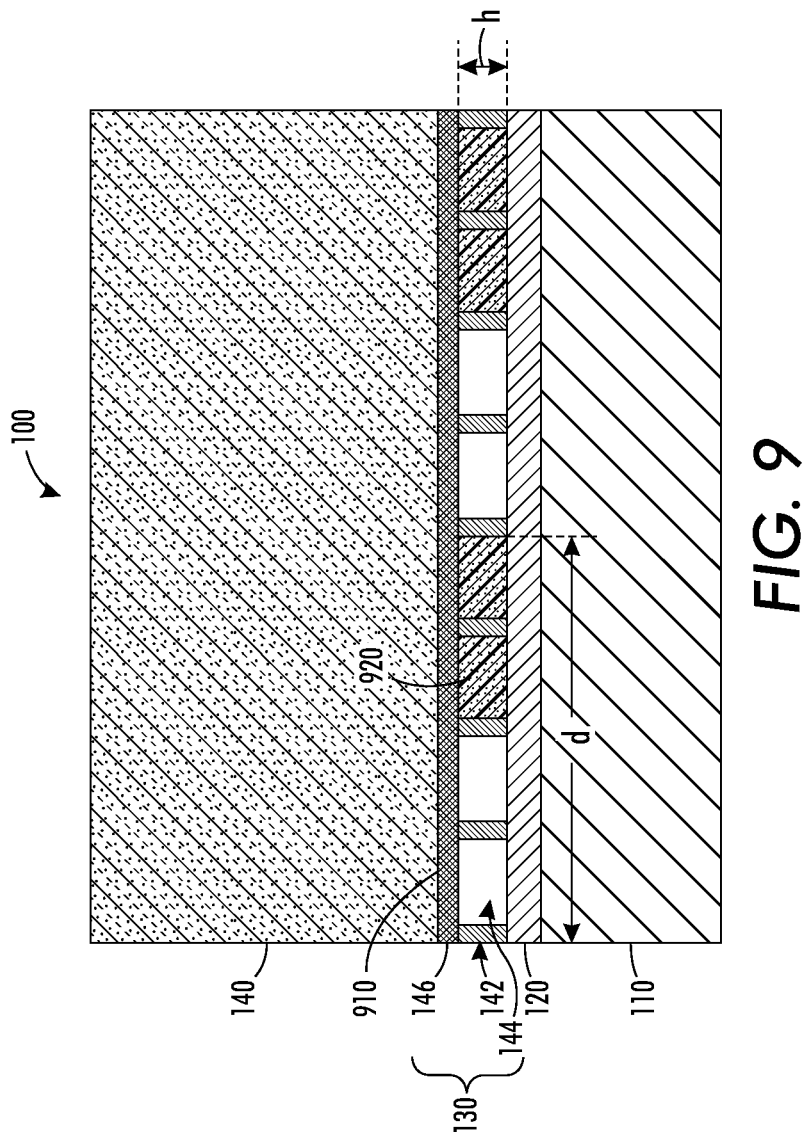
FIG. 9 is a diagram illustrating use of micro-fluid channel to deliver liquid to cavities according to one embodiment.

FIG. 9 is a diagram illustrating use of micro-fluid channel to deliver liquid to cavities according to one embodiment. The gap or cavity may be filled with gas, liquid, or eutectic material The principle of the embodiments may rely on the large impedance difference between air and solids/liquids that sets up a variable transmission and reflection. Any other member which may be actuated and produces a significant change in the amplitude or phase of the transmitter and reflected signal may be used in such a grating.

Fluidic channel 910 may be pumped full of gas or a liquid which may be water or a high impedance liquid like eutectic metals 920 into the gap or cavity 144.

In addition to the above variations, other variations may be possible. For example, the signal applied to the grating may be a single frequency or a chirp depending on the desired effect. Changing frequency may also be used to steer the ultrasound. The structure of the grating may follow any suitable pattern. The array may be a one-dimensional (1-D) or 2-D array having one of a linear grating, a chirped grating, or a zone/phase plate grating pattern.

Figure 10:
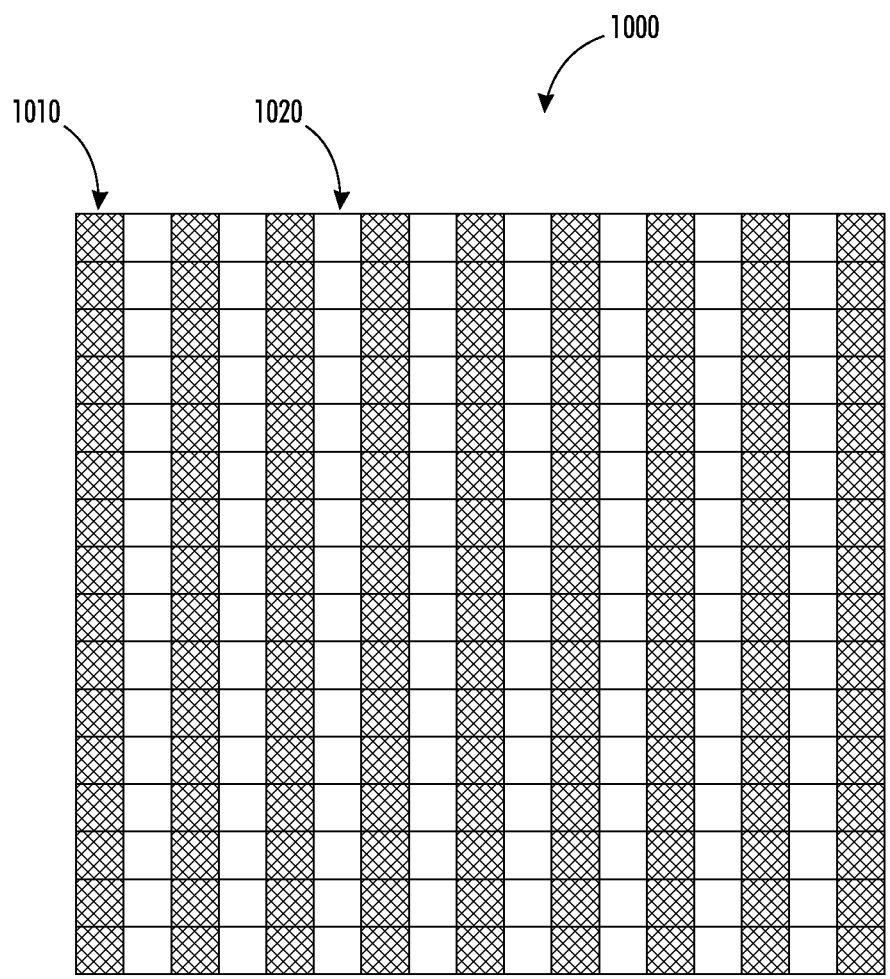
FIG. 10 is a diagram illustrating 2D linear grating pattern according to one embodiment.

FIG. 10 is a diagram illustrating 2D linear grating pattern 1000 according to one embodiment. The grating pattern 1000 shows a linear pattern in one dimension. The shaded linear structures 1010 correspond to the collapsed membranes and the unshaded structures 1020 correspond to the uncollapsed membranes.

Figure 11:
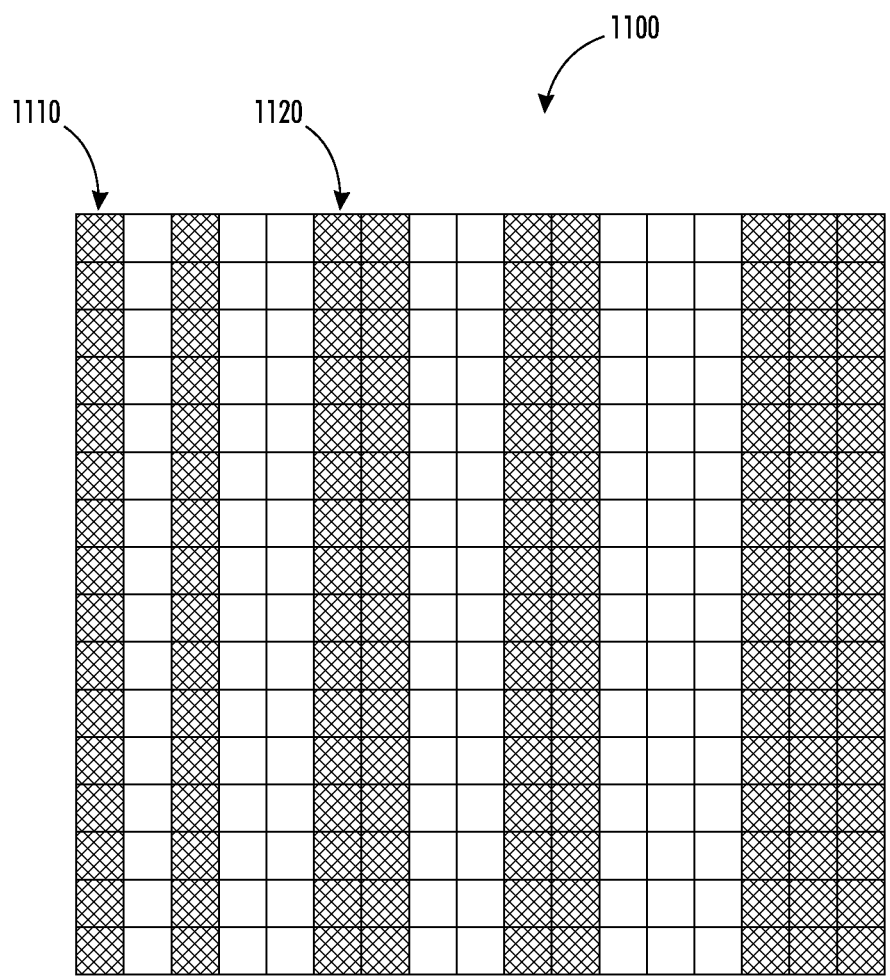
FIG. 11 is a diagram illustrating 2D linear chirped grating pattern according to one embodiment.

FIG. 11 is a diagram illustrating 2D linear chirped grating pattern 1100 according to one embodiment. The grating pattern 1100 shows a linear chirped grating. The shaded structures 1110 correspond to the collapsed membranes and the unshaded structures 1120 correspond to the uncollapsed membranes.

Figure 12:
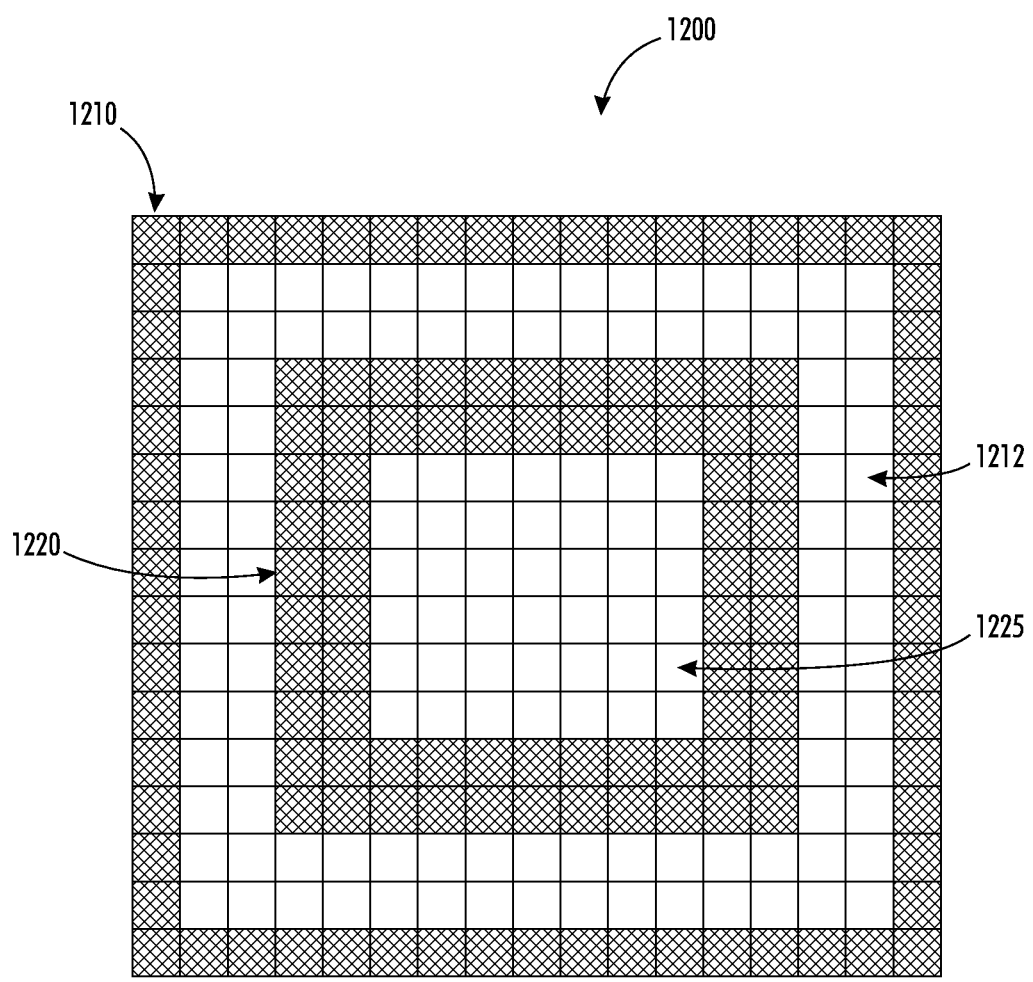
FIG. 12 is a diagram illustrating 2D zone/phase plate grating pattern according to one embodiment.

FIG. 12 is a diagram illustrating 2D zone/phase plate grating pattern 1200 according to one embodiment. The grating pattern 1200 shows a zone/phase plating grating. The shaded structures 1210 and 1220 correspond to the collapsed membranes and the unshaded structures 1215 and 1225 correspond to the uncollapsed membranes.

Figure 13:
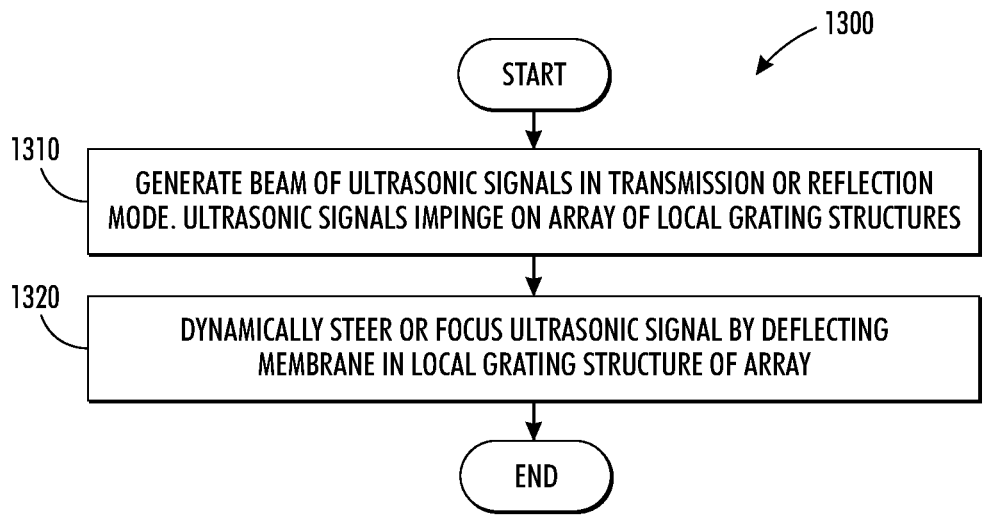
FIG. 13 is a flowchart illustrating a process to perform variable acoustic grating according to one embodiment.

FIG. 13 is a flowchart illustrating a process 1300 to perform variable acoustic grating according to one embodiment.

Upon START, the process 1300 generates a beam of ultrasonic signals to impinge on an array of local grating structures in a transmission or reflection mode (Block 1310). The ultrasonic signals may be reflected or transmitted according to the state if the local structures in the array. Next, the process 1300 dynamically steers or focuses an ultrasonic signal by deflecting a membrane in a local grating structure of the array of local grating structures (Block 1320). The structure of the array causes interference of the resulting signals which steers the beam. As discussed above, the local grating structure has a variable impedance and includes the membrane defining a gap or a cavity and may be supported by vertical walls (e.g., spacers). The membrane deflects from an uncollapsed state or inflates from an uninflated state into the gap or cavity when an actuation is applied to the membrane such that the impedance is modified. The process 1300 is then terminated.

Figure 14:
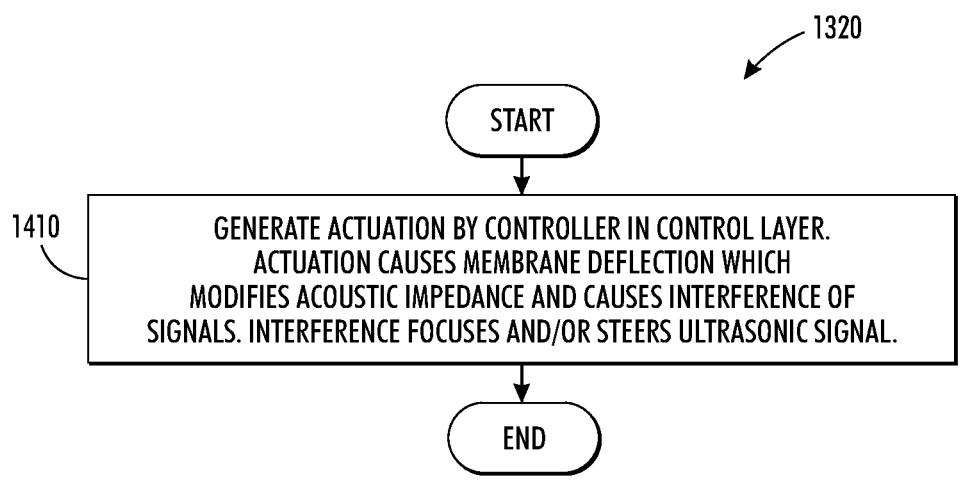
FIG. 14 is a flowchart illustrating a process to dynamically steer or focus ultrasonic signals according to one embodiment.

FIG. 14 is a flowchart illustrating the process 1320 shown in FIG. 13 to dynamically steer or focus ultrasonic signals according to one embodiment.

Upon START, the process 1320 generates an actuation by a controller in a controller layer of the array (Block 1410). The actuation causes membrane deflection/inflation which modifies the acoustic impedance of the array and causes interference of the ultrasonic signals. The interference focuses and/or steers the beam of ultrasonic signals. The process 1320 is then terminated.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus comprising:
an array of local acoustic grating structures, each of the local acoustic grating structures having a variable acoustic impedance such that the acoustic impedance is modified, steering an ultrasonic signal impinging on the array in a transmission mode through a medium, wherein each of the local grating structures comprises a membrane defining a gap or a cavity, the membrane deflecting from an uncollapsed state into the gap or the cavity when an actuation is applied to the membrane.

2. The apparatus of claim 1 further comprising:
a substrate; and
a control layer on the substrate and coupled to the array of the local grating structures, the control layer having a controller that generates the actuation.

3. The apparatus of claim 1 wherein the membrane deflects into the gap or the cavity in a collapsed state when the actuation exceeds a pull-in threshold.

4. The apparatus of claim 1 wherein the membrane is made of metal, plastic, or silicon nitride.

5. The apparatus of claim 1 wherein the substrate is made of glass, quartz, stainless steel, or plastic.

6. The apparatus of claim 2 further comprising:
a transmitter coupled to the substrate to generate the ultrasonic signal, the ultrasonic signal being reflected from the array when the membrane is in the uncollapsed state and transmitted through the medium when the membrane is in the collapsed state.

7. The apparatus of claim 1 wherein the membrane is a single-layer membrane, a multilayer membrane, a patterned membrane, or a bistable membrane.

8. The apparatus of claim 1 wherein the gap or the cavity is filled with gas, liquid, or eutectic material.

9. The apparatus of claim 1 wherein the array is a one-dimensional (1-D) or two-dimensional (2D) array having one of a linear grating, a chirped grating, or a zone/phase plate grating pattern.

10. A system comprising:
a transmitter to generate an ultrasonic signal through a medium; and
an acoustic grating structure coupled to the medium to dynamically steer or focus the ultrasonic signal, the acoustic grating structure comprising:
an array of local acoustic grating structures, each of the local acoustic grating structures having a variable acoustic impedance such that the acoustic impedance is modified steering an ultrasonic signal impinging on the array in a transmission mode through the medium,
wherein each of the grating structures comprises: a membrane defining a gap or a cavity, the membrane deflecting from an uncollapsed state into the gap or the cavity when an actuation is applied to the membrane.

11. The system of claim 10 wherein the grating structure further comprises:
a substrate; and
a control layer on the substrate and coupled to the array of the local grating structures, the control layer having a controller that generates the actuation.

* * * * *